US008483580B2

United States Patent
Miller

(10) Patent No.: US 8,483,580 B2
(45) Date of Patent: Jul. 9, 2013

(54) METHOD AND APPARATUS FOR ADJUSTING THE GAIN OF AN AMPLIFIER OF AN OPTICAL RECEIVER MODULE BASED ON LINK BIT ERROR RATE (BER) MEASUREMENTS

(75) Inventor: Frederick W. Miller, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 367 days.

(21) Appl. No.: 13/005,497

(22) Filed: Jan. 12, 2011

(65) Prior Publication Data
US 2012/0177367 A1 Jul. 12, 2012

(51) Int. Cl.
*H04B 10/06* (2006.01)
(52) U.S. Cl.
USPC .............................. 398/208; 398/27

(58) Field of Classification Search
USPC ............................................ 398/27, 208–210
See application file for complete search history.

(56) References Cited

U.S. PATENT DOCUMENTS

| 6,721,368 B1 | 4/2004 | Younis et al. |
| 2002/0080475 A1 | 6/2002 | Cornelius et al. |
| 2005/0135730 A1 | 6/2005 | Welch et al. |
| 2008/0204143 A1 | 8/2008 | Montemayor et al. |
| 2010/0067924 A1* | 3/2010 | Noda et al. ................ 398/202 |
| 2012/0070155 A1* | 3/2012 | Wieland et al. ............ 398/140 |

* cited by examiner

*Primary Examiner* — Leslie Pascal

(57) ABSTRACT

An open loop gain adjustment method and apparatus are provided for adjusting the gain of a TIA of an optical RX module based on measurements of the BER of the optical link in which the optical RX module is employed. The gain of the TIA is adjusted until a determination is made that a satisfactory or optimum link BER has been achieved.

20 Claims, 3 Drawing Sheets

METHOD AND APPARATUS FOR ADJUSTING THE GAIN OF AN AMPLIFIER OF AN OPTICAL RECEIVER MODULE BASED ON LINK BIT ERROR RATE (BER) MEASUREMENTS

TECHNICAL FIELD OF THE INVENTION

The invention relates to optical communications systems. More particularly, the invention relates to a method and an apparatus for adjusting the gain of an amplifier of an optical receiver module based on link bit error rate (BER) measurements.

BACKGROUND OF THE INVENTION

A typical optical transceiver module currently used in optical communications includes a transmitter portion and a receiver portion. The transmitter (TX) portion includes a laser driver, which is typically an integrated circuit (IC), one or more laser diodes, and an optics system. The laser driver outputs electrical signals to the laser diodes to modulate them. When the laser diodes are modulated, they output optical signals, which are then directed by the optics system of the TX portion onto the ends of respective transmit optical fibers or waveguides held within a connector that mates with the transceiver module. The TX portion typically also includes an open loop or closed loop optical output power control system for maintaining the average optical output power levels of the lasers at substantially constant levels.

The receiver (RX) portion of the optical transceiver module typically includes at least one photodetector, at least one transimpedance amplifier (TIA), and at least one linear amplifier (LA). The photodetector, which is typically a P-inversion-N (PIN) photodiode, produces an electrical current signal in response to light detected by the photodetector. The TIA receives a single-ended voltage signal from the photodetector and compares the voltage signal to a slicing threshold (TH) voltage level and produces a differential voltage signal. This differential voltage signal is then input to the LA. The LA is a high gain differential amplifier that quantizes or digitizes the differential voltage signal output from the TIA.

In a typical optical link, the optical link budget is a key factor in determining how well the optical link will perform. The maximum amount of optical loss that can be tolerated in the link is dependent on the minimum amount of optical transmit power that can be guaranteed and on the minimum amount of optical power that can be detected (receiver sensitivity). The link performance is also limited by the maximum power that the receiver can tolerate before the receiver experiences a condition known as receiver overload. This condition occurs when the maximum transmit power within eye safety limits is being transmitted over the link while the minimum amount of optical loss is occurring in the link. The overall dynamic range available in the optical receiver often limits the design of an optical system.

In the typical TIA used in an optical RX module, tradeoffs are made between gain, bandwidth, power dissipation and overload levels of the TIA. The sensitivity of an optical TX module is most significantly influenced by the noise, gain and bandwidth of the input stages of the TIA. The circuit noise is minimized by optimal sizing and biasing of the transistors of the TIA. The bandwidth of a TIA for a given process technology is affected by sizing and biasing of the transistors of the TIA. In general, an increase in the gain of the TIA, for a given amount of power dissipation, results in a decrease in the bandwidth of the TIA. Increasing the gain of the TIA reduces the input-referred noise, but reduces the bandwidth of the TIA. The reduced bandwidth is recoverable by increasing the bias current of the transistors of the TIA or by using novel circuit topologies. Increasing the gain of the TIA, however, can result in voltage swings in the TIA that cause receiver overload.

The upper limit of the voltage swing in the TIA is most heavily influenced by the following two factors, namely, voltage headroom and device breakdown voltage. The voltage headroom is set by the supply voltage of the TIA. Higher supply voltages result in more headroom, which allows for larger voltage swings before transistors are pushed into saturation (or out of saturation when referring to complementary metal oxide semiconductor (CMOS) devices). Receiver overload is observed when bipolar devices are pushed into saturation or CMOS devices are pushed into linear operation. When this happens, a large increase in jitter is observed, which is due to a decrease in the speed of the data transitions.

Device breakdown voltage refers to the breakdown voltage of the transistors that make up the TIA. For transistors made using advanced process technologies, device breakdown voltage presents a limit that cannot be overcome. Creative circuit techniques can be used to bias transistors in analog circuits so that they can operate with a supply voltage that significantly exceeds the breakdown voltages of the individual transistors. However, these techniques are only successful over a limited range of input signal swing.

The most common solution for overcoming these limitations is to use an automatic gain control (AGC) circuit in the optical RX module to adjust the gain of the TIA. AGC circuits employ a closed feedback loop having circuitry that measures the amplitude at the output of the TIA and compares it to an output amplitude reference value. If the measured output amplitude is above the reference value, then the gain of the TIA is reduced by the AGC circuit. If the measured output amplitude is below the reference value, then the gain of the TIA is increased by the AGC circuit. This type of AGC circuit architecture can provide a significant increase in the dynamic range of an optical RX module. Such AGC circuits may be implemented only in the TIA or in the entire receiver data path. If the primary motivation is to prevent the TIA from operating in saturation, then the AGC only needs to be implemented in the TIA.

There are challenges and drawbacks associated with typical AGC circuit architectures. One drawback is that it can be difficult for the closed feedback loop to achieve stability. A very low frequency dominant pole is required in the closed feedback loop. The closed feedback loop induces a low frequency cutoff (i.e., a band pass response) that limits the data patterns that can be transmitted. To support longer run lengths of bits, the bandwidth of the feedback loop must be made smaller, which can result in large amounts of silicon real estate being consumed by the AGC circuit.

Another drawback associated with typical AGC circuits is that the mechanism for adjusting the gain is usually a passive resistor in parallel with a metal oxide semiconductor (MOS) active resistor. The MOS active resistor has more parasitic capacitance than the passive resistor, which reduces the upper bandwidth of the receiver and also contributes more noise. Yet another drawback associated with typical AGC circuits is that they have higher power dissipation due to the feedback circuits and the larger bias currents needed to overcome the parasitic capacitance of the variable resistance.

Accordingly, a need exists for a method and an apparatus for controlling the gain of a TIA that eliminate the need for an AGC closed loop feedback circuit.

SUMMARY OF THE INVENTION

The invention is directed to an apparatus and method for adjusting the gain of a transimpedance amplifier (TIA) of an optical receiver (RX) module of an optical communications device based on link bit error rate (BER) measurements. The apparatus comprises an open loop gain adjustment circuit of the optical RX module and a module controller of the optical RX module. The gain adjustment circuit is configured to adjust the gain of the TIA of the optical RX module. The module controller of the optical RX module receives at least one control bit from a processing device that is external to the optical RX module. The control bit or bits are associated with a link BER measurement obtained by the external processing device. The module controller generates at least one control signal based on the control bit or bits received from the external processing device and outputs the control signal or signals to the open loop gain adjustment circuit to cause the open loop gain adjustment circuit to adjust the gain of the TIA.

The method comprises the following. In a module controller of the optical RX module, at least one control bit is received from a processing device that is external to the optical RX module. The control bit is associated with a link BER measurement obtained by the external processing device. In the module controller, at least one control signal based on the control bit or bits received from the external processing device is generated and output to the open loop gain adjustment circuit. In the open loop gain adjustment circuit, the control signal or signals output by the module controller are received and the open loop gain adjustment circuit adjusts the gain of the TIA based on the control signal or signals.

These and other features and advantages of the invention will become apparent from the following description, drawings and claims.

DETAILED DESCRIPTION OF AN ILLUSTRATIVE EMBODIMENT

In accordance with the invention, an open loop gain adjustment method and apparatus are provided for adjusting the gain of a TIA of an optical RX module based on measurements of the BER of the optical link in which the optical RX module is employed. The gain of the TIA is adjusted until a determination is made that a satisfactory or optimum link BER has been achieved. The apparatus and method will now be described with reference to a few illustrative or exemplary embodiments.

Figure 1:
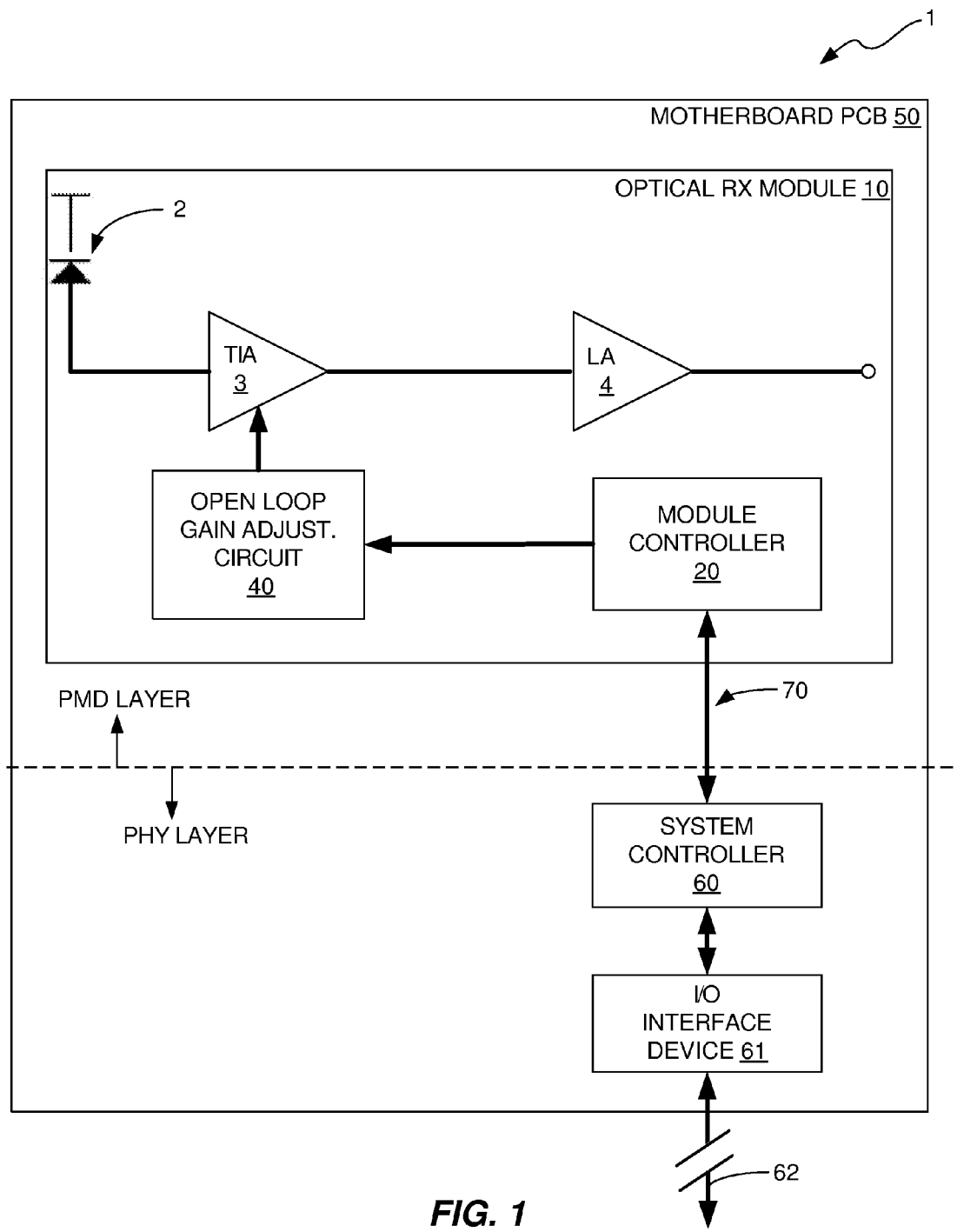
FIG. 1 illustrates a block diagram of an optical communications system in which the gain of a TIA of an optical RX of the system is adjusted based on BER measurements obtained by a system controller.

FIG. 1 illustrates a block diagram of an optical communications system 1 in which the gain of a TIA 3 of an optical RX module 10 is adjusted based on BER measurements obtained by a system level controller 60 that is external to the optical RX module 10. The optical RX module 10 is mounted on a motherboard printed circuit board (PCB) 50 of the optical communications system 1. The optical communications system 1 typically also includes a TX module (not shown), but for ease of illustration and for clarity, the TX module is not shown in FIG. 1.

The optical RX module 10 includes components that are typically used in optical RX modules, such as a photodetector 2, the aforementioned TIA 3, a LA 4, and a module controller 20. The optical RX module 10 also includes components that are not found in typical optical RX modules, such as an open loop gain adjustment circuit 40. The photodetector 2 is typically a P-I-N photodiode. The photodetector 2, the TIA 3 and the LA 4 represent a single channel of the optical receiver 1. It should be noted, however, that the optical RX module 1 may be a multi-channel, optical RX module having multiple photodetectors 2, multiple TIAs 3 and multiple LAs 4. For ease of illustration and for purposes of clarity, a single optical channel is shown in FIG. 1.

In addition to the system controller 60, an input/output (I/O) interface device 61 is also mounted on the motherboard PCB 50. The I/O interface device 61 interfaces the motherboard PCB 50 with an optical link 62. The system controller 60 communicates with the module controller 20 via an interface 70, which may be, for example, an Inter-Integrated Circuit ($I^2C$) interface. The module controller 20 controls operations of the optical RX module 10, such as, for example, outputting control signals to the open loop gain adjustment circuit 40 to cause it to set the gain of the TIA 3 and outputting control signals to a laser diode driver integrated circuit (not shown) of the TX module (not shown) to cause the bias and/or modulation currents of the laser diode (not shown). The system controller 60 controls operations of the optical communications system 1 by sending and receiving control bits via the I/O interface device 61 over the optical link 62 and by sending and receiving control bits via the interface 70 to and from the module controller 20.

The optical RX module 10 is part of the Physical Medium Dependent (PMD) layer of the Fiber Distributed Data Interface (FDDI) model, which is a known optical network model defined by a known set of standards of the American National Standards Institute (ANSI) and by the International Organization for Standardization (ISO). The system controller 60, the I/O interface device 61, and the optical link 62 are part of the Physical Layer Protocol (PHY) layer of the FDDI model. The PMD layer of the FDDI model is governed by standard ANSI X3, 166-1989 and ISO standard 9314-3. The PHY layer of the FDDI model is governed by standards ANSI X3, 148-1988 and ISO 9314-1.

In accordance with an illustrative embodiment, the system controller 60 measures the link BER, and based on the measured link BER, sends control bits via the interface 70 to the module controller 20. It is known to measure the link BER in the PHY layer in a system controller. Therefore, in accordance with this illustrative embodiment, existing technology is used to allow the link BER measurements to be obtained in the PHY layer by the system controller 60. Based on these link BER measurements, the system controller 60 sends control bits via the interface 70 to the module controller 20. Upon receiving these control bits, the module controller 20 sends a control signal to the open loop gain adjustment circuit 40 to cause it to adjust the gain of the TIA 3. The process of adjusting the gain of the TIA 3 in this manner continues until the system controller 60 determines that the link BER is at a satisfactory or optimum value.

The open loop gain adjustment circuit 40 may have the same or a similar configuration to that of existing AGC circuits, except that instead of adjusting the TIA gain based on the feedback from the output of the AGC circuit, the open loop gain adjustment circuit 40 adjusts the TIA gain based on control signals received from the module controller 20. For example, the open loop gain adjustment circuit 40 may comprise a passive resistor in parallel with a MOS active resistor.

A large portion of the dynamic range required in an optical RX module is attributed to variations in the optical loss that occurs in the optical connector module that couples the optical fiber of the link with the RX module. However, once the optical fiber has been connected to the RX module and the link has been established, the optical loss attributed to the connector is fixed, and the variation in the optical loss over time due to aging or temperature is small.

In accordance with this illustrative embodiment, the gain of the TIA 3 is adjusted in discrete levels, or steps, during a calibration sequence that occurs at power up, although the calibration sequence may be performed at any time. It is generally not possible to make discrete adjustments in the gain of the TIA 3 while transmitting live data, as the adjustments may be large enough to cause error bursts. However, because much of the aforementioned optical loss is associated with sources that are fixed for a given optical link, performing a calibration sequence at power up is sufficient to provide the dynamic range extension that is needed without the complexity and cost of a closed loop AGC circuit. Thus, the invention obviates the need to include a closed loop AGC circuit in the optical RX module 10.

The total dynamic range that an optical RX module should cover may be separated into two categories, namely, a first portion that varies with temperature, supply voltage and any other time-varying parameter and a second portion that varies with manufacturing process, optical coupling loss due to misalignment, and or optical connector losses that do not change once the cables are plugged in and the link is established. The first portion will be referred to herein as the "variable portion" due to the fact that it may change after the link has been established. The second portion will be referred to herein as the "fixed portion" due to the fact that it generally does not change once the link has been established.

For a link with a de-mateable optical cable, the fixed portion may change after each de-mate and mate. For this reason, the link will be re-established and the gain adjustment calibration algorithm of the invention will be re-performed each time the optical connector is disconnected from the RX module 10. Once the optical connector is mated with the RX module 10, the majority of any optical loss can be assumed to be attributed to the fixed portion, and therefore can be assumed not to change with time.

Making the gain adjustments in discrete levels allows the optical RX to meet performance criteria (e.g., sensitivity and overload) over a range that is sufficient to cover both the fixed and variable portions of the dynamic range. The number of discrete gain adjustment levels that will be used is determined based on the dynamic range needed to cover the variable and fixed portions of the dynamic range. The TIA 3 should be able to handle the variable portion of the dynamic range without adjusting the gain of the TIA 3.

Depending on the power level at the optical RX module 10, the jitter at the output of the optical RX module 10 may affect the system level BER. If the gain of the TIA 3 is set to a level that is too low, the sensitivity of the optical RX module 10 will be reduced. If this happen while the input power of the optical RX module 10 is low, excess random jitter (RJ) accumulated in the optical link 62 will cause an increase in the BER. In this case, the system controller 60 sends corresponding control bits to the module controller 20 via the interface 70, which, in turn, cause the module controller 20 to cause the open loop gain adjustment circuit 40 to increase the gain of the TIA 3 until the BER measured by the system controller 60 is at an optimal or acceptable level. If the gain of the TIA 3 is too high, the overload capability is reduced. If this happens while the input power of the optical RX module 10 is high, excess deterministic jitter (DJ) accumulated in the optical link 62 will cause an increase in the BER. In this case, the system controller 60 sends corresponding control bits to the module controller 20 via the interface 70, which, in turn, cause the module controller 20 to cause the open loop gain adjustment circuit 40 to decrease the gain of the TIA 3 until the BER measured by the system controller 60 is at an optimal or acceptable level.

If the interface 70 is an $I^2C$ interface, one or more registers are included in the interface 70 that can be written and read by the module controller 20 and by the system controller 60. One of these registers may be used to perform the gain adjustment process. For example, an N-bit register (not shown) may be dedicated to storing N bits that correspond to the gain setting of the TIA 3. The system controller 60 measures the link BER, and determines, based on the measured link BER, if the gain of the TIA 3 needs to be increased or decreased. If the system controller 60 determines that the gain of the TIA 3 needs to be increase or decreased, the system controller 60 writes an updated N-bit value to the register. The module controller 20 then reads the updated N-bit value out of the register and causes the open loop gain adjustment circuit 40 to adjust the gain of the TIA 3 accordingly. Thus, in this case, the system controller 60 performs the tasks of measuring the link BER and determining the amount and direction of the gain adjustment, if any. The module controller 20 simply reads the gain adjustment value out of the register and outputs a control signal to the open loop gain adjustment circuit 40 to cause it to make the appropriate gain adjustment.

As an alternative to writing N-bit gain adjustment values to a register of an $I^2C$ interface, the system controller 60 may instead write link BER measurement values to the register. In this case, the module controller 20 reads the link BER measurement value from the register and determines the appropriate adjustment to be made to the gain of the TIA 3. The module controller 20 then outputs a control signal to the open loop gain adjustment circuit 40 to cause it to make the appropriate adjustment to the gain of the TIA 3.

Figure 2:
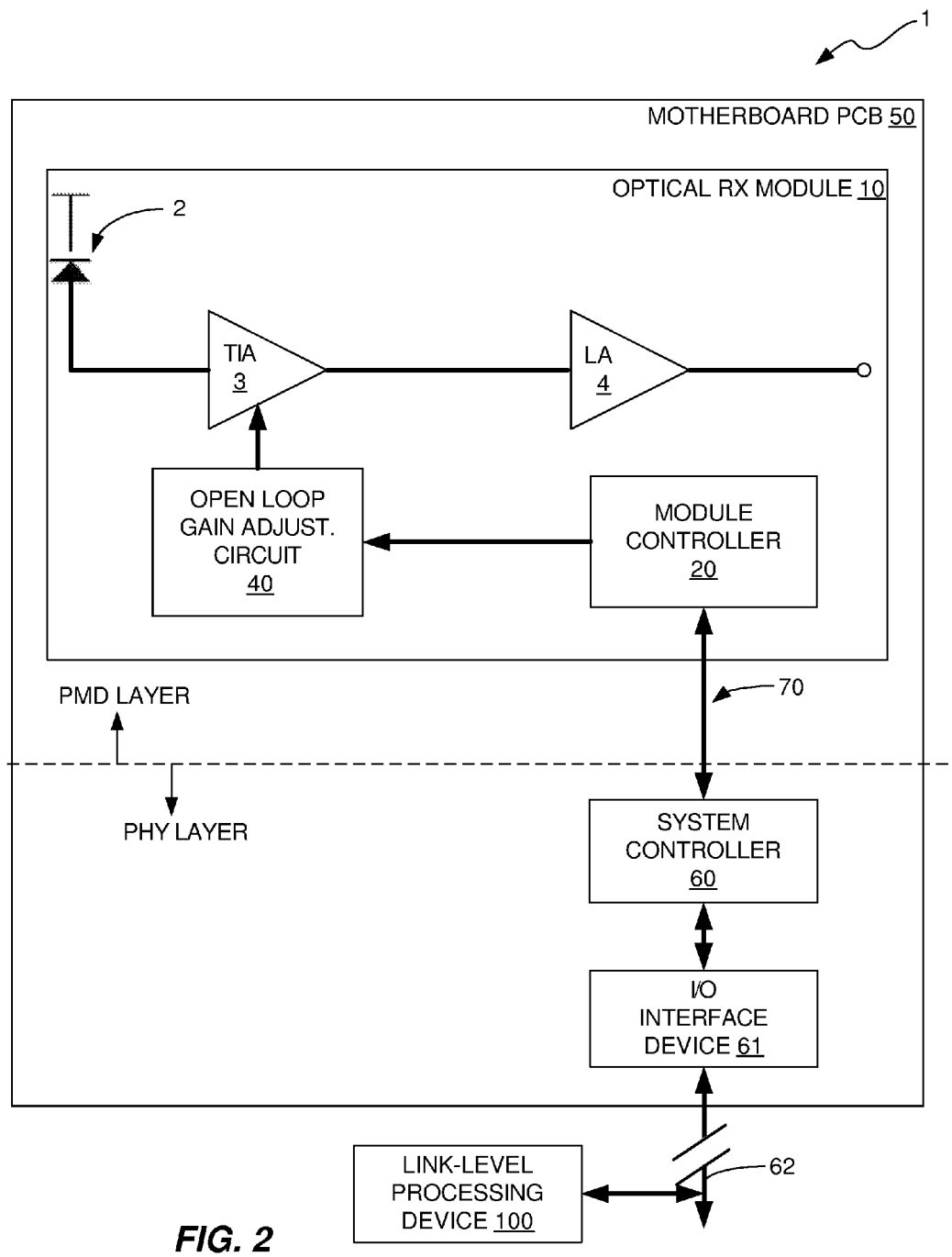
FIG. 2 illustrates a block diagram of the optical communications system shown in FIG. 1 coupled by an optical link to a link-level processing device that obtains the BER measurements.

FIG. 2 illustrates a block diagram of the optical communications system 1 shown in FIG. 1 coupled by the optical link 62 to a link-level processing device 100 that performs BER measurements. Like numerals in FIGS. 1 and 2 represent like components or elements. The only difference between the embodiment shown in FIG. 1 and the embodiment shown in FIG. 2 is that the link-level processing device 100 rather than the system controller 60 obtains the link BER measurements. The link-level processing device 100 may be, for example, a microprocessor or microcontroller that performs a link BER measurement algorithm in software or firmware. The link-level processing device may be any device that is coupled to the optical link 62, that is external to the optical communications device 1 and part of the PHY layer or a higher layer, and that is capable of obtaining the link BER measurements.

If the interface 70 is an $I^2C$ interface, the link-level processing device 100 communicates with the system controller 60 to cause the system controller 60 to read and write the aforementioned N-bit register. The link-level processing device 100 measures the link BER, and determines, based on the measured link BER, if the gain of the TIA 3 needs to be increased or decreased. If the link-level processing device 100 determines that the gain of the TIA 3 needs to be increase or decreased, the link-level processing device 100 causes the system controller 60 to write an updated N-bit value to the register. The module controller 20 then reads the updated N-bit value out of the register and causes the open loop gain adjustment circuit 40 to adjust the gain of the TIA 3 accordingly.

It should be noted that many modifications may be made to the embodiments described above with reference to FIGS. 1 and 2. One thing that the embodiments shown in FIGS. 1 and 2 have in common is that the link BER measurements are obtained by a device in the PHY layer that also initiates the process of adjusting the gain of the TIA 3. Thus, the processes of measuring the link BER and of adjusting the gain of the TIA 3 are both part of an open loop gain adjustment process that results in the gain of the TIA 3 being adjusted based on measurements obtained in the PHY layer or in one or more higher layers. The open loop gain adjustment process obviates the aforementioned drawbacks and costs associated with implementing closed loop AGC circuits in optical RX modules.

Figure 3:
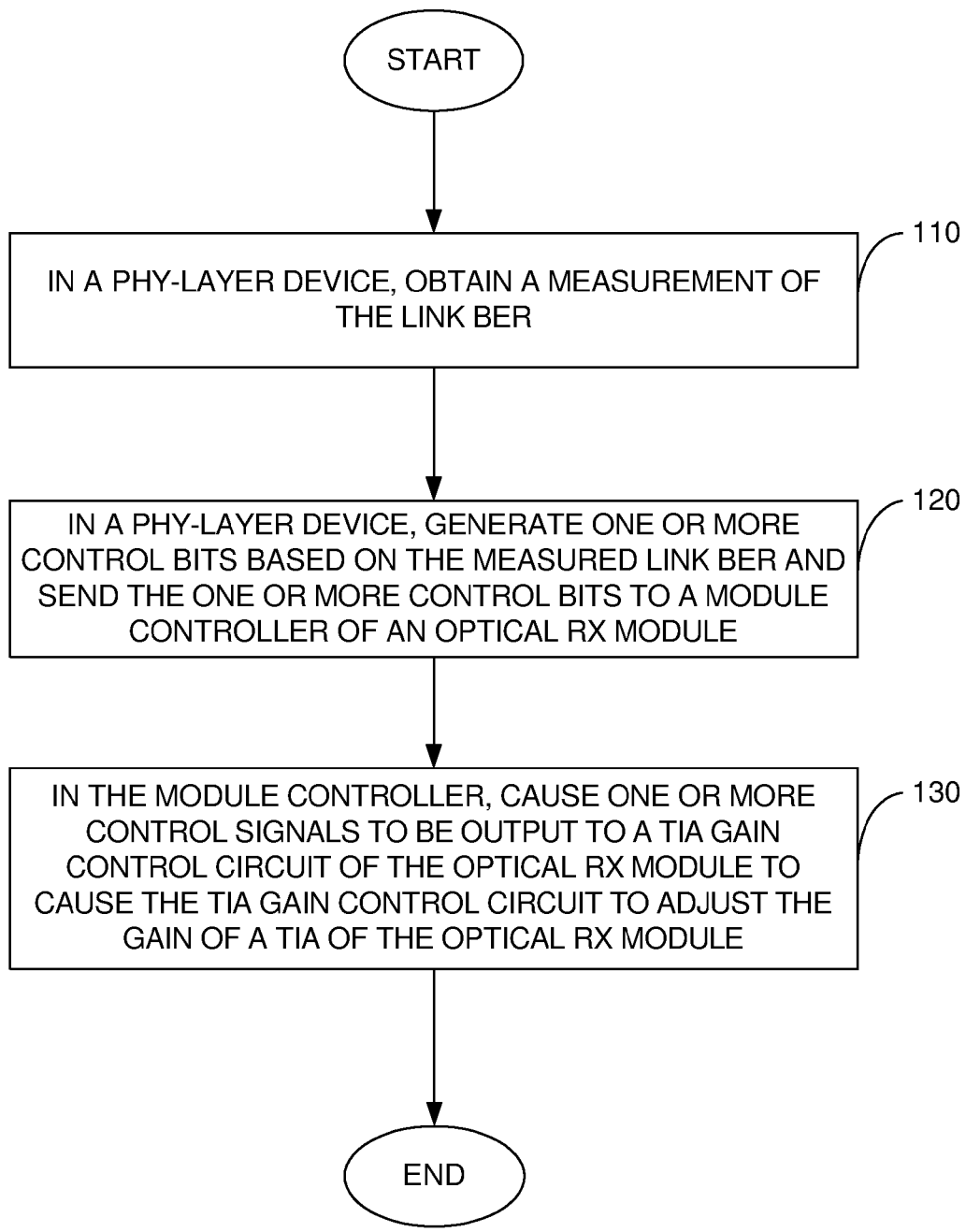
FIG. 3 illustrates a flowchart that represents the open loop gain adjustment method in accordance with an illustrative embodiment.

FIG. 3 illustrates a flowchart that represents the open loop gain adjustment method in accordance with an illustrative embodiment. As indicated above, the method is typically performed at power up, although it may be performed at any time. At the commencement of the method, a measurement of the link BER is obtained by a PHY-layer device, as indicated by block 110. The term "PHY-layer device", as that term is used herein, denotes a device that is in the PHY layer. It should be noted that a device that is in the PHY layer is not in the PMD layer, and vice versa. A PHY-layer device then generates one or more control bits based on the measured link BER and causes the generated control bit or bits to be sent to the optical RX module, as indicated by block 120.

The control bit or bits that are generated by the PHY-layer device at step 120 may indicate the value of the measured link BER or an amount and direction of adjustment to be made to the gain of the TIA, depending on the manner in which the method and apparatus are implemented. For example, the system controller 60 may obtain the link BER measurement and send one or more bits indicative of the measurement to the module controller 20, which would (1) determine, based on the measured link BER, the amount by which the gain of the TIA 3 needs to be adjusted and (2) output one or more control signals to the open loop gain control circuit 60 to cause it to make the appropriate TIA gain adjustment. Alternatively, as another example, the system controller 60 may obtain the link BER measurement and, based on the measurement, determine any adjustment to be made to the gain of the TIA 3. The system controller 60 would then send one or more control bits corresponding to the gain adjustment to the module controller 20, which would then output one or more control signals to the open loop gain control circuit 40 to cause it to make the corresponding gain adjustment.

The PHY-layer devices referred to in steps 110 and 120 may be the same device or they may be different devices. For example, the steps 110 and 120 may both be performed by the system controller 60, or step 110 may be performed by the link-level processing device 100 and step 120 may be performed by the system controller 60. In other words, the tasks represented by steps 110 and 120 may be performed in a single PHY-layer device or they may be distributed over multiple PHY-layer devices.

After steps 110 and 120 have been performed, the modular controller 20 of the optical RX module 10 outputs one or more control signals to the open loop gain control circuit 40 to cause it to adjust the gain of the TIA 3 based on the link BER measurement obtained by the PHY-layer device, as indicated by block 130.

One of the benefits of having steps 110 and 120 performed in the PHY layer is that they can be performed in software and/or firmware being executed on a processor of the PHY-layer device. For example, in the event that the interface 70 is implemented as an I$^2$C interface, the system controller 60 can read bits representing the current TIA gain setting from the aforementioned N-bit register of the I$^2$C interface and send these bits to the link-level processing device 100. Software being executed by a processor of the link-level processing device 100 may obtain link BER measurement values, calculate new gain adjustment values, and send corresponding new TIA gain setting bits to the system controller 60. The system controller 60 will then write the new TIA gain setting bits to the N-bit register of the I$^2$C interface. The module controller 20 will then read these bits from the N-bit register and cause the open loop gain adjustment circuit 40 to adjust the gain of the TIA 3 accordingly.

For any portions of the method shown in FIG. 3 that are performed in software, the corresponding computer instructions will be stored on a computer-readable medium, such as, for example, a read only memory (ROM) device, a programmable ROM device (EPROM), an erasable PROM (EPROM), an electrically erasable ROM (EEPROM), and a static or dynamic random access memory (SRAM or DRAM) device. Non-solid state devices may also be used to store the computer instructions, such as, for example, magnetic recording mediums.

It should be noted that the invention has been described with respect to illustrative embodiments for the purpose of describing the principles and concepts of the invention. The invention is not limited to these embodiments. For example, while the invention has been described with reference to a single-channel optical RX module, the optical RX module may have multiple channels and may be a stand-alone optical RX module or the RX side of an optical transceiver module that includes one or more optical TXs. As will be understood by those skilled in the art in view of the description being provided herein, many modifications may be made to the embodiments described herein without deviating from the goals of the invention, and all such modifications are within the scope of the invention.

What is claimed is:

1. An apparatus for adjusting the gain of a transimpedance amplifier (TIA) of an optical receiver (RX) module of an optical communications device based on link bit error rate (BER) measurements, the apparatus comprising:
   an open loop gain adjustment circuit of the optical RX module, the gain adjustment circuit being configured to adjust a gain of the TIA of the optical RX module; and
   a module controller of the optical RX module, the module controller receiving at least one control bit from a processing device that is external to the optical RX module, said at least one control bit being associated with a link BER measurement obtained by the external processing device, the module controller generating at least one control signal based on said at least one control bit received from the external processing device and outputting said at least one control signal to the open loop gain adjustment circuit to cause the open loop gain adjustment circuit to adjust the gain of the TIA.

2. The apparatus of claim 1, wherein the external processing device is a system controller of the optical communications system, the system controller being part of a Physical Layer Protocol (PHY) layer of a Fiber Distributed Data Interface (FDDI) model, the module controller and the open loop gain adjustment circuit being parts of a Physical Medium Dependent (PMD) layer of the FDDI model.

3. The apparatus of claim 2, wherein said at least one control bit represents a gain adjustment value obtained by the system controller based on the measured link BER, and wherein said at least one control signal causes the open loop gain adjustment circuit to adjust the gain of the TIA by an amount related to the gain adjustment value.

4. The apparatus of claim 2, wherein said at least one control bit represents a link BER measurement value corresponding to the link BER measurement obtained by the system controller, and wherein the module controller determines a gain adjustment value based on said one or more control bits received from the system controller and generates said at least one control signal to represent the gain adjustment value.

5. The apparatus of claim 1, wherein the external processing device is a link-level processing device, the link-level processing device being part of a Physical Layer Protocol (PHY) layer of a Fiber Distributed Data Interface (FDDI) model, the module controller and the open loop gain adjustment circuit being parts of a Physical Medium Dependent (PMD) layer of the FDDI model, and wherein the link-level processing device is external to the optical communications system.

6. The apparatus of claim 5, wherein said at least one control bit represents a gain adjustment value obtained by the link-level processing device based on the measured link BER, and wherein said at least one control signal outputted by the module controller causes the open loop gain adjustment circuit to adjust the gain of the TIA by an amount related to the gain adjustment value.

7. The apparatus of claim 6, wherein said at least one control bit represents a link BER measurement value corresponding to the link BER measurement obtained by the link-level processing device, and wherein the module controller determines a gain adjustment value based on said one or more control bits received from the link-level processing device and generates said at least one control signal to represent the gain adjustment value.

8. The method of claim 1, wherein the external processing device is a system controller module of the optical communications system, the system controller being part of a Physical Layer Protocol (PHY) layer of a Fiber Distributed Data Interface (FDDI) model, the controller module and the open loop gain adjustment circuit being parts of a Physical Medium Dependent (PMD) layer of the FDDI model.

9. The method of claim 8, wherein said at least one control bit represents a gain adjustment value obtained by the system controller based on the measured link BER, and wherein said at least one control signal causes the open loop gain adjustment circuit to adjust the gain of the TIA by an amount related to the gain adjustment value.

10. The method of claim 8, wherein said at least one control bit represents a link BER measurement value corresponding to the link BER measurement obtained by the system controller, and wherein the module controller determines a gain adjustment value based on said one or more control bits received from the system controller and generates said at least one control signal to represent the gain adjustment value.

11. An apparatus for adjusting the gain of a transimpedance amplifier (TIA) of an optical receiver (RX) module of an optical communications device based on link bit error rate (BER) measurements, the apparatus comprising:
  a system controller mounted on a system circuit board of the optical communications system;
  an open loop gain adjustment circuit of the optical RX module, the optical RX module being mounted on the system circuit board, the gain adjustment circuit being configured to adjust a gain of the TIA of the optical RX module; and
  a module controller of the optical RX module, the module controller communicating with the system controller via an interface, the module controller receiving at least one control bit from the system controller via the interface, said at least one control bit being associated with a link BER measurement obtained by the system controller, the module controller generating at least one control signal based on said at least one control bit received from the system controller and outputting said at least one control signal to the open loop gain adjustment circuit to cause the open loop gain adjustment circuit to adjust the gain of the TIA.

12. The apparatus of claim 11, wherein the system controller is part of a Physical Layer Protocol (PHY) layer of a Fiber Distributed Data Interface (FDDI) model, the module controller and the open loop gain adjustment circuit being parts of a Physical Medium Dependent (PMD) layer of the FDDI model.

13. The apparatus of claim 12, wherein said at least one control bit represents a gain adjustment value obtained by the system controller based on the measured link BER, and wherein said at least one control signal causes the open loop gain adjustment circuit to adjust the gain of the TIA by an amount related to the gain adjustment value.

14. The apparatus of claim 13, wherein the interface is an Inter-Integrated Circuit (I2C) interface.

15. The apparatus of claim 12, wherein said at least one control bit represents a link BER measurement value corresponding to the link BER measurement obtained by the system controller, and wherein the module controller determines a gain adjustment value based on said one or more control bits received from the system controller and generates said at least one control signal to represent the gain adjustment value.

16. A method for adjusting the gain of a transimpedance amplifier (TIA) of an optical receiver (RX) module of an optical communications device based on link bit error rate (BER) measurements, the method comprising:
  in a module controller of the optical RX module, receiving at least one control bit from a processing device that is external to the optical RX module, said at least one control bit being associated with a link BER measurement obtained by the external processing device;
  in the module controller, generating at least one control signal based on said at least one control bit received from the external processing device and outputting said at least one control signal to an open loop gain adjustment circuit; and
  in the open loop gain adjustment circuit, receiving said at least one control signal output by the module controller and causing the open loop gain adjustment circuit to adjust the gain of the TIA based on said at least one control signal.

17. The method of claim 16, wherein the external processing device is a link-level processing device that is external to the optical communications system, the link-level processing device being part of a Physical Layer Protocol (PHY) layer of a Fiber Distributed Data Interface (FDDI) model, the controller module and the open loop gain adjustment circuit being parts of a Physical Medium Dependent (PMD) layer of the FDDI model.

18. The method of claim 17, wherein said at least one control bit represents a gain adjustment value obtained by the link-level processing device based on the measured link BER, and wherein said at least one control signal outputted by the module controller causes the open loop gain adjustment circuit to adjust the gain of the TIA by an amount related to the gain adjustment value.

19. The method of claim 17, wherein said at least one control bit represents a link BER measurement value corresponding to the link BER measurement obtained by the link-level processing device, and wherein the module controller determines a gain adjustment value based on said one or more control bits received from the link-level processing device and generates said at least one control signal to represent the gain adjustment value.

20. A non-transitory computer-readable medium having computer instructions stored thereon for execution by a module controller for adjusting the gain of a transimpedance amplifier (TIA) of an optical receiver (RX) module of an optical communications device based on link bit error rate (BER) measurements, the instructions comprising:

a first set of instructions for execution by the module controller of the optical RX module, the first set of instructions causing the module controller to receive at least one control bit from a processing device that is external to the optical RX module, said at least one control bit being associated with a link BER measurement obtained by the external processing device;

a second set of instructions for execution by the module controller, the second set of instructions causing at least one control signal to be generated based on said at least one control bit received from the external processing device; and a third set of instructions for execution by the module controller, the third set of instructions causing said at least one control signal to be output to an open loop gain adjustment circuit to cause the open loop gain adjustment circuit to adjust the gain of the TIA.

* * * * *